(12) United States Patent
Tamura

(10) Patent No.: US 8,164,908 B2
(45) Date of Patent: Apr. 24, 2012

(54) PROTECTOR FOR PLATE-LIKE PERIPHERAL DEVICE OF ELECTRONIC EQUIPMENT

(75) Inventor: Tsuyoshi Tamura, Osaka (JP)

(73) Assignee: Panasonic Corporation, Osaka (JP)

( * ) Notice: Subject to any disclaimer, the term of this patent is extended or adjusted under 35 U.S.C. 154(b) by 395 days.

(21) Appl. No.: 12/510,583

(22) Filed: Jul. 28, 2009

(65) Prior Publication Data

US 2010/0027210 A1    Feb. 4, 2010

(30) Foreign Application Priority Data

Jul. 29, 2008  (JP) ................................ 2008-194472

(51) Int. Cl.
*H05K 7/00* (2006.01)
(52) U.S. Cl. ...................................................... 361/728
(58) Field of Classification Search .................. 361/807, 361/810, 756, 727; 439/945, 946
See application file for complete search history.

(56) References Cited

U.S. PATENT DOCUMENTS

| | | | | |
|---|---|---|---|---|
| 5,544,007 A * | 8/1996 | Inoue | ................... | 361/679.32 |
| 5,608,606 A * | 3/1997 | Blaney | ................... | 361/679.32 |
| 5,679,007 A * | 10/1997 | Potdevin et al. | ............ | 439/76.1 |
| 5,833,473 A * | 11/1998 | Betker et al. | .................. | 439/76.1 |
| 5,879,173 A * | 3/1999 | Poplawski et al. | ............ | 439/138 |
| 5,912,806 A * | 6/1999 | Onoda et al. | .................. | 361/737 |
| 5,973,925 A * | 10/1999 | Kraemer | ................... | 361/737 |
| 6,109,931 A * | 8/2000 | Yotsutani | ................... | 439/76.1 |
| 6,115,257 A * | 9/2000 | Laity | ................... | 361/737 |
| 6,181,564 B1 * | 1/2001 | Furusho | ................... | 361/737 |
| 6,224,391 B1 * | 5/2001 | Horie et al. | ................... | 439/64 |
| 6,264,506 B1 * | 7/2001 | Yasufuku et al. | ............ | 439/638 |
| 6,599,152 B1 * | 7/2003 | Oliphant et al. | ............... | 439/660 |
| 6,692,268 B2 * | 2/2004 | Kung et al. | ................... | 439/76.1 |
| 6,742,069 B2 * | 5/2004 | Papa et al. | ................... | 710/302 |
| 6,742,070 B2 * | 5/2004 | Fuchida | ................... | 710/303 |
| 7,018,227 B2 * | 3/2006 | Takahashi | ................... | 439/347 |
| 7,040,928 B1 * | 5/2006 | Lai et al. | ................... | 439/630 |
| 7,101,188 B1 * | 9/2006 | Summers et al. | ............ | 439/59 |
| 7,161,811 B2 * | 1/2007 | Richter | ................... | 361/737 |
| 7,229,299 B2 * | 6/2007 | Katayanagi et al. | ............ | 439/95 |
| 7,265,989 B2 * | 9/2007 | Son et al. | ................... | 361/737 |

(Continued)

FOREIGN PATENT DOCUMENTS

JP         10-283450          10/1998

*Primary Examiner* — Lisa Lea Edmonds
*Assistant Examiner* — Xanthia C Cunningham
(74) *Attorney, Agent, or Firm* — Wenderoth, Lind & Ponack, L.L.P.

(57) ABSTRACT

A protector for a card-shaped peripheral device for insertion into a slot of objective equipment, includes: a first wall hating a first guide surface for guiding insertion of the peripheral device; a second wall parallel with and opposite to at least part of the first wall, and having a second guide surface for guiding insertion movement of the peripheral device in cooperation with at least part of the first guide surface; and a pair of side walls parallel with an insertion direction of the peripheral device, and connecting end portions of the first and second walls in a width-wise direction thereof perpendicular to the insertion direction. First and second end surfaces perpendicular to the insertion direction are formed respectively at end portions in the insertion direction of the first and second walls. Each of the side walls has a protrusion protruding in the insertion direction from the first and second end surfaces, respectively.

11 Claims, 12 Drawing Sheets

U.S. PATENT DOCUMENTS

| | | | |
|---|---|---|---|
| 7,285,023 B1 * | 10/2007 | Chang et al. | 439/638 |
| 7,303,442 B2 * | 12/2007 | Fan | 439/630 |
| 7,427,026 B2 * | 9/2008 | Kojima et al. | 235/441 |
| 7,494,380 B2 * | 2/2009 | Lai | 439/630 |
| 2004/0082224 A1 * | 4/2004 | Lwee | 439/630 |
| 2007/0127225 A1 * | 6/2007 | Slaton | 361/807 |
| 2008/0102707 A1 * | 5/2008 | Lai | 439/630 |

\* cited by examiner

Fig.2
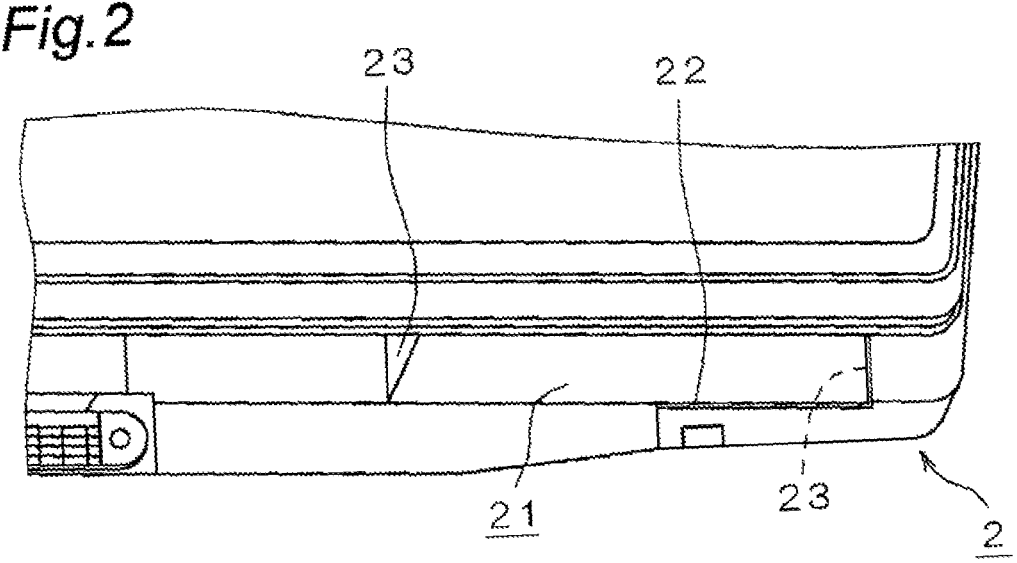
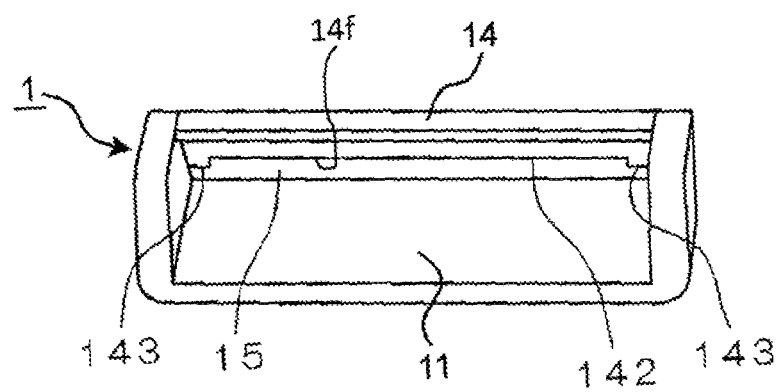
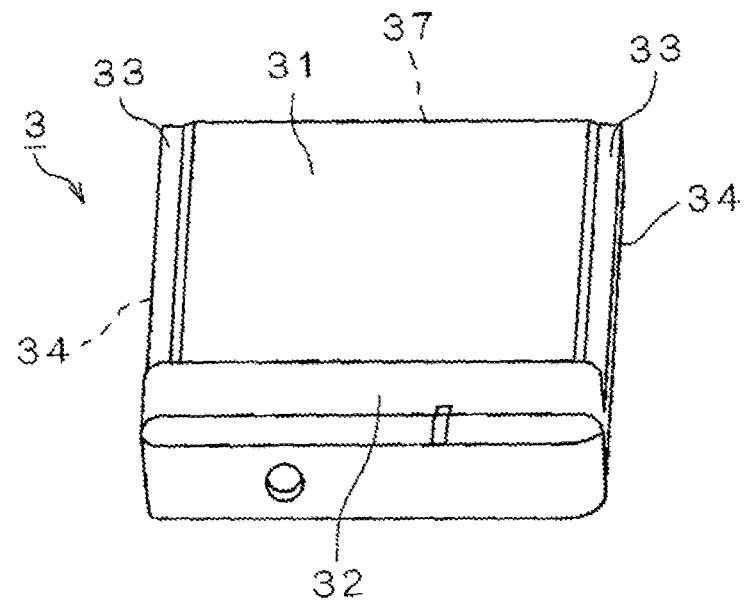

PROTECTOR FOR PLATE-LIKE PERIPHERAL DEVICE OF ELECTRONIC EQUIPMENT

BACKGROUND OF THE INVENTION

The present invention relates to a protector for a plate-like peripheral device which is used by inserting into an insertion site of a predetermined objective equipment, more specifically, to a protector for protecting a card-shaped peripheral device to be inserted into a slot provided to a body of the objective equipment from mechanical impact shock, and electronic equipment which is used with such a protector.

There has been widely known a so-called PC card developed by the PCMCIA (Personal Computer Memory Card Interface Association) as a plate- or card-shaped peripheral device which is used with and disposed in a slot-like insertion site of predetermined electronic equipment. Examples of the PC card include a memory card incorporating therein a semiconductor memory in and from which various kinds of information can be written and read, an expansion card having the function as an adapter for a memory card smaller in size than the PC card and incorporating therein transmitting means and receiving means capable of transmitting and receiving information via a radio, and the like.

Such a PC card is used with, inserted into, and disposed in a slot formed in a chassis of a computer, and further, is widely applied to personal authentication, a communication modem, or the like in portable electronic equipment such as a note type personal computer, a PDA (abbreviating a personal digital assistant), or the like.

There have been known inconveniences that the capacity of the above-described PC card restrictively depends upon the depth of the slot in a configuration in which the entire PC card is contained inside of the slot with the PC card being inserted into the slot in the computer or that communications may be shut out in making the communications with the outside via a radio. In view of the above, in recent years, there has prevailed a PC card whose part (i.e., an end on a counter-insertion side) protrudes from the slot.

However, when the PC card is used while protruding from the chassis of the electronic equipment, there arise problems such as bending and breakage of the PC card body if an external force acts upward, downward, or sideways of the protrusion. Not only the damage on the PC card per se but also breakage of an inner terminal to be connected to a connection terminal at the tip of the PC card inside of the computer may be induced. In such a case, the computer body need be repaired, thereby raising a disadvantage to a user.

Japanese Patent Laid-open Publication No. 10-283450 proposes one countermeasure against such a problem to be solved. Specifically, a protector including a holder for holding a PC card in engagement in an insertion direction, in which a bottom is brought into contact with an installation surface of the computer while the PC card is installed in a computer, is proposed as a protector for a PC card provided with an insertion site to be inserted into and disposed in a slot formed in a computer and a protrusion protruding outside of a chassis of the computer in the insertion state. The use of such a protector allows an impact force from above to be received at the installation surface, and therefore, the PC card can be suppressed from being bent or broken by the external force from above.

However, since the bottom of the protector is brought into contact with the installation surface of the computer in the configuration disclosed in the above prior art document, the PC card can be protected from the external force from above but this protection can be achieved only in a case where the computer is installed on the installation surface. When the computer is carried, satisfactory protection cannot be expected.

Specifically, while a user inadvertently keeps the PC card in the insertion site, the computer may be moved or carried in a bag. In such a case, the computer is not installed at the installation surface, and therefore, the above-described protector is uselessly disposed.

In addition, in this case, it is conceived that the PC card is liable to be subjected to the external force in not only a vertical direction but also a transverse direction. However, the configuration disclosed in the above patent document cannot achieve satisfactory protection from the action of the external force in the transverse direction.

SUMMARY OF THE INVENTION

The present invention was made in view of the foregoing conventional technical problems. An object of the present invention is to provide a protector which is capable of effectively minimizing damage of the card-shaped peripheral device itself and damage of a connection site provided inside the electronic equipment for connecting a terminal of the card-shaped peripheral device.

In order to achieve the object, the present invention provides a protector for a plate-like peripheral device which is used by being inserted into an insertion site of predetermined objective equipment, comprising: a first wall including a first guide surface for guiding insertion movement of the plate-like peripheral device; a second wall being arranged in parallel with at least a part of the first wall and opposite to the same with a given distance therebetween, and including a second guide surface for guiding insertion movement of the plate-like peripheral device in cooperation with at least a part of the first guide surface; a pair of side walls being formed in parallel with an insertion direction of the plate-like peripheral device, and connecting to each other an end portion of the first wall and an end portion of the second wall in a width-wise direction thereof which is perpendicular to the insertion direction; wherein a first end surface and a second end surface perpendicular to the insertion direction are formed respectively at end portions in the insertion direction of the first wall and the second wall; and wherein each of the side walls are provided with a protrusion which protrudes by a given amount in the insertion direction from the first end surface and the second end surface, respectively.

According to the present invention, the protrusion provided to the protector is fitted into the insertion site into which the plate-like peripheral device is inserted. Therefore, it is possible to protect the plate-like peripheral device against action of external forces in a transverse direction as well as upward and downward directions of the plate-like peripheral device. Further, it is possible to effectively minimize damage of the plate-like peripheral device itself and damage of the connection site provided inside the electronic equipment for connecting a terminal of the plate-like peripheral device.

In the protector according to the present invention, by providing the projection piece which projects by the given amount in the insertion direction from at least one of the first end surface and the second end surface and by forming the projection piece integrally with the protrusion, it is possible to enhance restraining performance in a transverse direction and a vertical direction of the protector against a slot into which the plate-like peripheral device is inserted, thereby enhancing protection performance for the plate-like peripheral device.

Further, in the protector according to the present invention, by providing the plate-like portion extending in a direction of a thickness of the first wall or the second wall on at least one of the first end surface and the second end surface, it is possible to attach the protector more stably on a surface of the chassis around the slot of the objective equipment.

Furthermore, in the protector according to the present invention, by providing the second protrusion arranged in a vicinity of the protrusion of the side wall and protrudes in the same direction on at least one of the side walls, it is possible to enhance attaching stability of the protector against the slot.

Furthermore, in the protector according to the present invention, by forming the tapered surface sloping outward along the insertion direction of the plate-like peripheral device on the outer side surface of at least one of the side walls, it is possible to allow an external force to escape along the tapered surface obliquely outward in a case in which the external force is applied from outside (that is, in a transverse direction) when the plate-like peripheral device is attached, thereby enhancing protection performance for the plate-like peripheral device.

Furthermore, in the protector according to the present invention, in a case in which the leg portion having a given height is provided on a back surface being opposite to the first guide surface of the first wall, by setting the height of the leg so that the position of the end of the leg is substantially coincident with the position of bottom surface of the objective equipment, the external force from the upper side of the plate-like peripheral device can be surely borne by an installation surface when the objective equipment is used in a condition in which it is placed on the installation surface, such that it is possible to remarkably enhance protection performance for the plate-like peripheral device in such a case.

Furthermore, in a case in which the plate-like peripheral device is provided with the convex portion which is to protrude outward from the chassis of the predetermined objective equipment in the state in which the plate-like peripheral device is inserted into the insertion site of the objective equipment, by adopting the constitution in which the guide surface of the first wall guides the insertion movement when the plate-like peripheral device is inserted into the insertion site of the objective equipment, while the guide surface supports the convex portion in the state in which the plate-like peripheral device is inserted into the insertion site of the objective equipment, it is possible to enhance protection performance for the plate-like peripheral device having the convex portion which is to protrude outward from the chassis of the predetermined objective equipment in the attached state.

Furthermore, in electronic equipment comprising a chassis that is provided with an insertion site into which a plate-like peripheral device is inserted, an inner terminal provided at an inner portion of the insertion site of the chassis in order to receive a connection terminal provided at an end in an insertion direction of the plate-like peripheral device, and being used with the plate-like peripheral device by inserting it into the insertion site through the foregoing protector, by adopting a constitution in which the electronic equipment is provided with a release element for releasing a connection between the inner terminal and the connection terminal of the plate-like peripheral device, and the release element is located in a space formed in the second protrusion, it is possible to attempt to simplify the arrangement of the release element and a peripheral structure thereof.

BRIEF DESCRIPTION OF THE DRAWINGS

The present invention will be described in detail with reference to the accompanying drawings.

FIG. 2 is a perspective view showing the main part of the protector in a state in which the protector is used for a note type PC;

DETAILED DESCRIPTION OF THE PREFERRED EMBODIMENTS

A description will be given below of a protector in preferred embodiments according to the present invention with reference to the attached drawings by way of a LAN card provided with a radio transmitter/receiver as a plate-like peripheral device and a note type personal computer (hereinafter abbreviated as a PC) as electronic equipment which is objective equipment used with the LAN card inserted thereinto.

Here, the LAN card equipped with the function of radio transmission/reception is defined to have the size of an insertion portion into the PC in a width of 54 mm and a height of 5 mm according to the standard. Therefore, the size of an insertion port formed in a chassis of the PC is set to a width of 55 mm and a height of 6 mm in order to install the LAN card in the PC.

In a description below, terms indicating specified directions (for example, terms "upper," "lower," "right," "left," phrases including them, "clockwise," and "counterclockwise") are only used for the sake of easy understanding of the invention with reference to the drawings, but the terms should not be interpreted as limiting the present invention.

Figure 1:
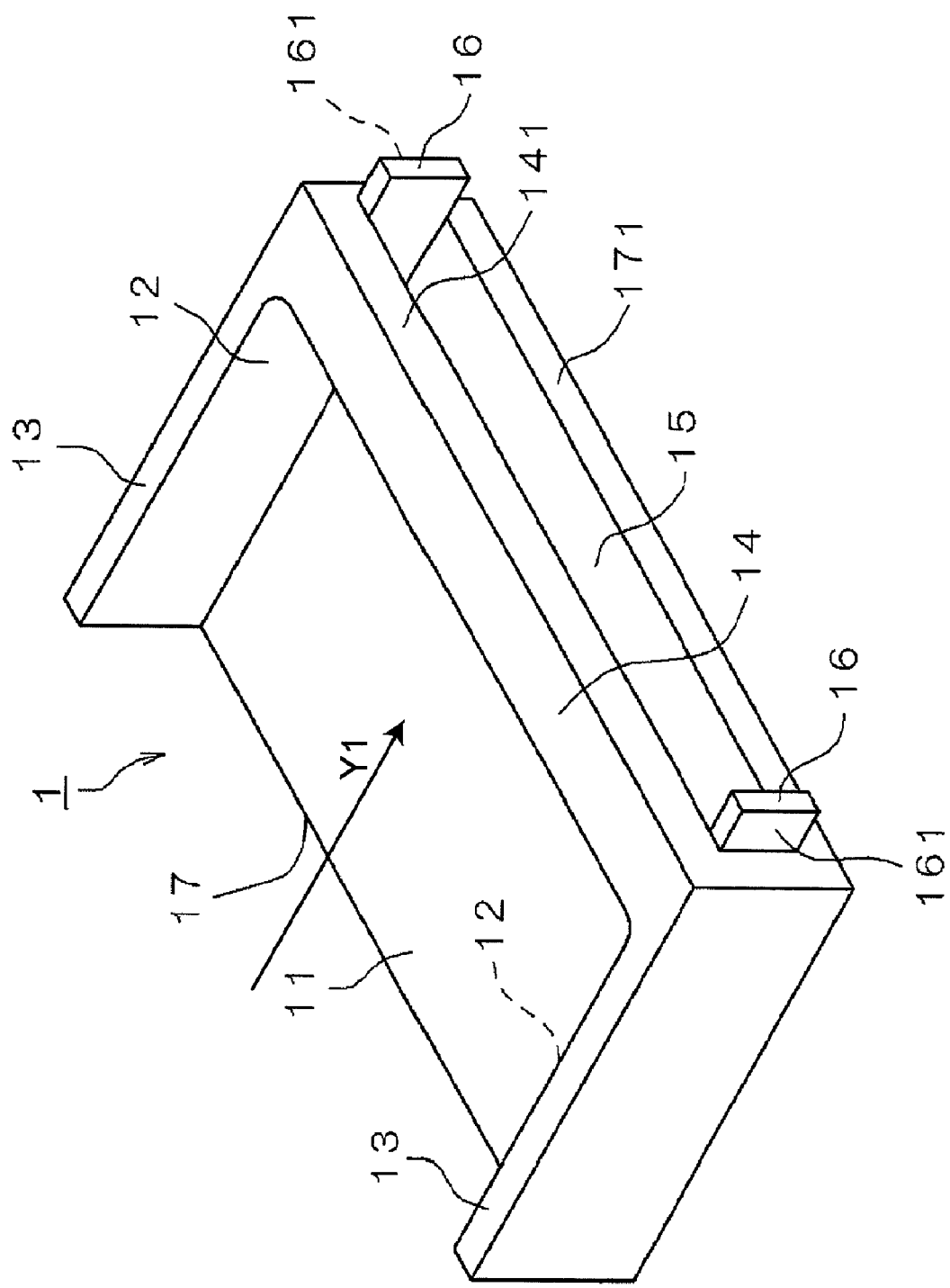
FIG. 1 is an overall perspective view of a protector according to a first embodiment.

FIG. 1 is an overall perspective view of a protector according to a first embodiment; and FIG. 2 is a perspective view showing the main part with the protector being used for a note type PC.

As shown in FIGS. 1 and 2, a protector 1 in the present embodiment is to be inserted into a slot 21 (see FIG. 2) formed in a chassis of a note type PC. The protector 1 includes a first wall 17 having a guide surface (i.e., a first guide surface) 11 for guiding an insertion movement of a LAN card 3 into the slot 21 and a second wall 14 arranged in parallel to and opposite to at least a part of the first wall 17 with a given distance therebetween.

In the present embodiment, the second wall 14 extends in a given length at a tip in an insertion direction of the LAN card 3 (i.e., in a direction indicated by an arrow Y1 in FIG. 1). Moreover, the second wall 14 has a second guide surface 14f, not shown in FIG. 1 but apparent in FIG. 2, for guiding the insertion movement of the LAN card 3 in cooperation with at least a part of the first guide surface 11. Ends of the first wall 17 and the second wall 14 in a direction perpendicular to the card insertion direction (i.e., a widthwise direction) are joined to each other via a pair of vertical walls (i.e., side walls) 13 formed in parallel to the card insertion direction. Each of the vertical walls 13 has, inside thereof, a side guide surface 12 for guiding the insertion movement of the side of the LAN card 3 during the insertion movement.

It is preferable that the first wall 17, the second wall 14, and the vertical walls 13 should be integrally molded with a synthetic resin material. Preferably, the upper surface of the second wall 14 and the upper surfaces of the pair of vertical walls 13 are formed flush with each other, and further, the lower surface of the first wall 17 and the lower surfaces of the pair of vertical walls 13 are formed flush with each other.

An opening 15 is defined at a tip in the card insertion direction by the first wall 17, the second wall 14, and the vertical walls 13. The LAN card 3 is inserted through the opening 15.

A first end 171 and a second end 141, which are perpendicular to the card insertion direction, are formed at distal ends of the first wall 17 and the second wall 14 in the card insertion direction, respectively. The first end 171 and the second end 141 are positioned within the same plane. When the protector 1 is installed in the chassis of the PC 2 provided with the slot 21 (see FIG. 2), into which the LAN card 3 is inserted, the first end 171 and the second end 141 abut against the surface of the chassis of the PC 2.

Protrusions 16 protruding in the card insertion direction by a given amount from the first end 171 and the second end 141 are formed at distal ends of the side walls 13, respectively. Each of the protrusions 16 extends in a vertical direction. The outer surfaces of the protrusions 16 serve as fitting surfaces 161 which are fitted to inner side surfaces 23 of an insertion port 22 in the slot 21 in the PC 2 by a predetermined press-fitting force (i.e., a fitting force).

FIG. 2 is a perspective view illustrating a state in which the PC 2 having the slot 21, the LAN card 3, and the protector 1 installed therebetween have not been disposed yet, with main parts being enlarged. As shown in FIG. 2, the slot 21 includes the insertion port 22, through which the LAN card 3 is inserted, and the inner side surfaces 23.

The LAN card 3 includes mainly a rectangular plate-like card portion 31 to be inserted into the slot 21 in the PC 2 and a convex portion 32 formed in a given height on a counter-insertion side of the card portion 31. The side surfaces of the card portion 31 and the side surfaces of the convex portion 32 are formed flush with each other, thereby forming card side surfaces 34.

The convex portion 32 incorporates therein electronic equipment responsible for radio transmission/reception, an antenna, and the like. In an installation state in which the card portion 31 is inserted into the slot 21 in the PC 2, the convex portion 32 protrudes from the surface of the chassis of the PC 2 toward the outside, wherein its lower surface is supported at the first guide surface 11 of the first wall 17. As a consequence, it is possible to enhance the protection performance of the LAN card 3 provided with the convex portion 32 protruding outward from the surface of the chassis of the PC 2 in the installation state.

An electrode surface 37 provided with a connection terminal to be connected to an inside connector, not shown, disposed at the back of the slot 21 in the PC 2 is formed at the tip of the card portion 31 in the insertion direction. Preferably, a pair of right and left guide grooves 33 should be formed in upper portions of side surfaces of the card portion 31 along a longitudinal direction.

In the meantime, guide protrusions 143 are formed at right and left ends at the back surface of the second wall 14 of the protector 1. A guide cavity 142 is formed between both of the guide protrusions 143. When the card portion 31 is inserted into the slot 21 in the PC 2, the guide grooves 33 of the card portion 31 are fitted to and guided by the guide protrusions 143 in the protector 1, so that the card portion 31 can be smoothly inserted into the slot 21 with stability.

Here, a length of an interval defined by the right and left guide protrusions 143 (i.e., the length of the guide cavity 142 in a card widthwise direction) is set smaller than a length of an interval defined by the right and left protrusions 16 (i.e., the length of the opening 15 in a card widthwise direction), so that not only can the LAN card 3 be readily inserted between the protrusions 16 but also the protector 1 can readily absorb an impact load even if the impact load is exerted on the LAN card 3 from either one of the side walls 34 during the insertion of the LAN card 3, thereby effectively suppressing the generation of damage on the slot 21 in the PC 2 or the inside connector, not shown, at the back. Similarly, the height of each of the right and left guide protrusions 143 from the first guide surface 11 is set smaller than the height of the second wall 14 from the first guide surface 11 at the back, so that the protector 1 can readily absorb an impact load even if the impact load is exerted on the LAN card 3 in a direction perpendicular to the card portion 31 (i.e., in the vertical direction) during the insertion of the LAN card 3, thereby effectively suppressing the generation of damage on the slot 21 in the PC 2 or the inside connector, not shown, at the back. A description will be given below of a method for inserting and disposing the LAN card 3 into and in the slot 21 in the PC 2 by using the protector 1 configured as described above.

First of all, the fitting surfaces 161 of the protrusions 16 in the protector 1 are fitted to the inner side surfaces 23 of the slot 21 from the state shown in FIG. 2, and thus, the protector 1 is fixed to the chassis of the PC 2. At this time, the fitting surfaces 161 of the right and left protrusions 16 are fitted with respect to the inner side surfaces 23 of the slot 21 by the predetermined fitting force. In this manner, the fitting surfaces 161 of the protrusions 16 are fitted to the inner side surfaces 23 of the slot 21, and therefore, a material for the fitting surface 161 should preferably have flexibility. In the present embodiment, the entire protector 1 is integrally molded with the synthetic resin material.

The tip of the protrusion 16 in the protrusion direction and the inner side surface 23 of the slot 21 should preferably constitute an uneven engagement structure, although not shown in FIG. 1. The protector 1 may be detached from the slot 21 when no LAN card 3 is disposed in the PC 2, and therefore, it is desirable that pawls, for example, forming the uneven structure should be detachably attached.

The fitting surfaces 161 of the pair of protrusions 16 are fitted to the inner side surfaces of the slot 21 in this manner, so that the protector 1 is fixed with respect to the PC 2. In this state, the back surface of the LAN card 3 is placed on the first guide surface 11 of the first wall 17, to slide in the insertion direction. The tip of the card portion 31 of the LAN card 3 sliding at the first guide surface 11 passes through the opening 15, and then, protrudes to the insertion port 22 of the slot 21 beyond the first end 171 of the first wall 17 and the second end 141 of the second wall 14. Thereafter, the insertion movement proceeds, so that the connection terminal of the electrode surface 37 at the tip of the card portion 31 is connected to the inside connector disposed at the back of the slot 21, thereby completing the insertion and installation of the LAN card 3 into and in the slot 21.

If an impact force is exerted on the LAN card 3 in the transverse direction (i.e., in a direction substantially perpendicular to the card side surface 34) with the LAN card 3 being inserted into and disposed in the slot 21, the impact force and a moment load associated therewith can be actually received at a fitting portion between the fitting surfaces 161 of the protrusions 16 of the protector 1 and the inner side surfaces 23 of the slot 21, thus effectively alleviating damage on the LAN card 3 and the slot 21, and further, the electrode surface 37 provided in the LAN card 3 and the inside connector at the back of the slot 21.

If an impact force is exerted on the LAN card 3 in the transverse direction (i.e., in the direction substantially perpendicular to the card side surface 34) during an initial process in which the LAN card 3 is inserted into the slot 21, the impact force and a moment load associated therewith are exerted on the fitting portions between the fitting surfaces 161 of the protrusions 16 of the protector 1 and the inner side surfaces 23 of the slot 21. In a case where the impact force is a predetermined value or less, the impact force and the moment load associated therewith are received at the fitting portions. In contrast, if the impact force is greater than the predetermined value, the impact force and the moment load associated therewith cannot be received at the fitting portions, and therefore, the engagement is released. As a consequence, it is possible to avoid the LAN card 3 and the slot 21 being largely damaged.

Moreover, if the impact force is exerted on the card portion 31 of the LAN card 3 at a right angle (i.e., in the direction perpendicular to the card surface) with the LAN card 3 being inserted into and disposed in the slot 21, the impact force and the moment load associated therewith can be received at the fitting portions between the upper and lower surfaces of the protrusions 16 of the protector 1 and the upper and lower inner surfaces of the slot 21, thus effectively alleviating the damage on the LAN card 3 and the slot 21, and further, the electrode surface 37 provided in the LAN card 3 and the inside connector at the back of the slot 21.

If the impact force is exerted on the card portion 31 of the LAN card 3 at a right angle (i.e., in the direction perpendicular to the card surface) during an initial process in which the LAN card 3 is inserted into the slot 21, the impact force and the moment load associated therewith are exerted on the fitting portions between the upper and lower surfaces of the protrusion 16 of the protector 1 and the upper and lower inner surfaces of the slot 21. In the case where the impact force is a predetermined value or less, the impact force and the moment load associated therewith are received at the fitting portions. In contrast, if the impact force is greater than the predetermined value, the impact force and the moment load associated therewith cannot be received at the fitting portions, and therefore, the engagement is released. As a consequence, it is possible to avoid the LAN card 3 and the slot 21 being largely damaged.

The guide cavity 142 for guiding the card portion 31 of the LAN card 3 and the guide protrusions 143 in engagement with the guide grooves 33 at the LAN card 3 are provided at the back surface (the first guide surface 11 constituting the opening 15) of the second wall 14 of the protector 1, as described above, thus not only facilitating the insertion of the LAN card 3 into the protector 1 but also enhancing durability against the moment load associated with the impact force by the length of the second wall 14 in the card insertion direction as for the impact force in any of the above-described directions.

As described above, the protrusions 16 provided in the protector 1 are fitted to the insertion port 22 of the slot 21, through which the LAN card 3 is inserted, in the present embodiment, so that the LAN card 3 can be protected from the external force in not only directions upward and downward of the LAN card 3 but also in the transverse direction. In addition, it is possible to effectively suppress not only the damage of the LAN card 3 per se but also the damage on the inside connector in the PC 2 to be connected to the LAN card 3.

Next, a description will be given of a protector according to a second embodiment. In the description below, constituent elements having the same configurations and functions as those of the constituent elements in the above-described first embodiment are designated by the same reference numerals, and therefore, their explanation will not be given below.

Figure 3:
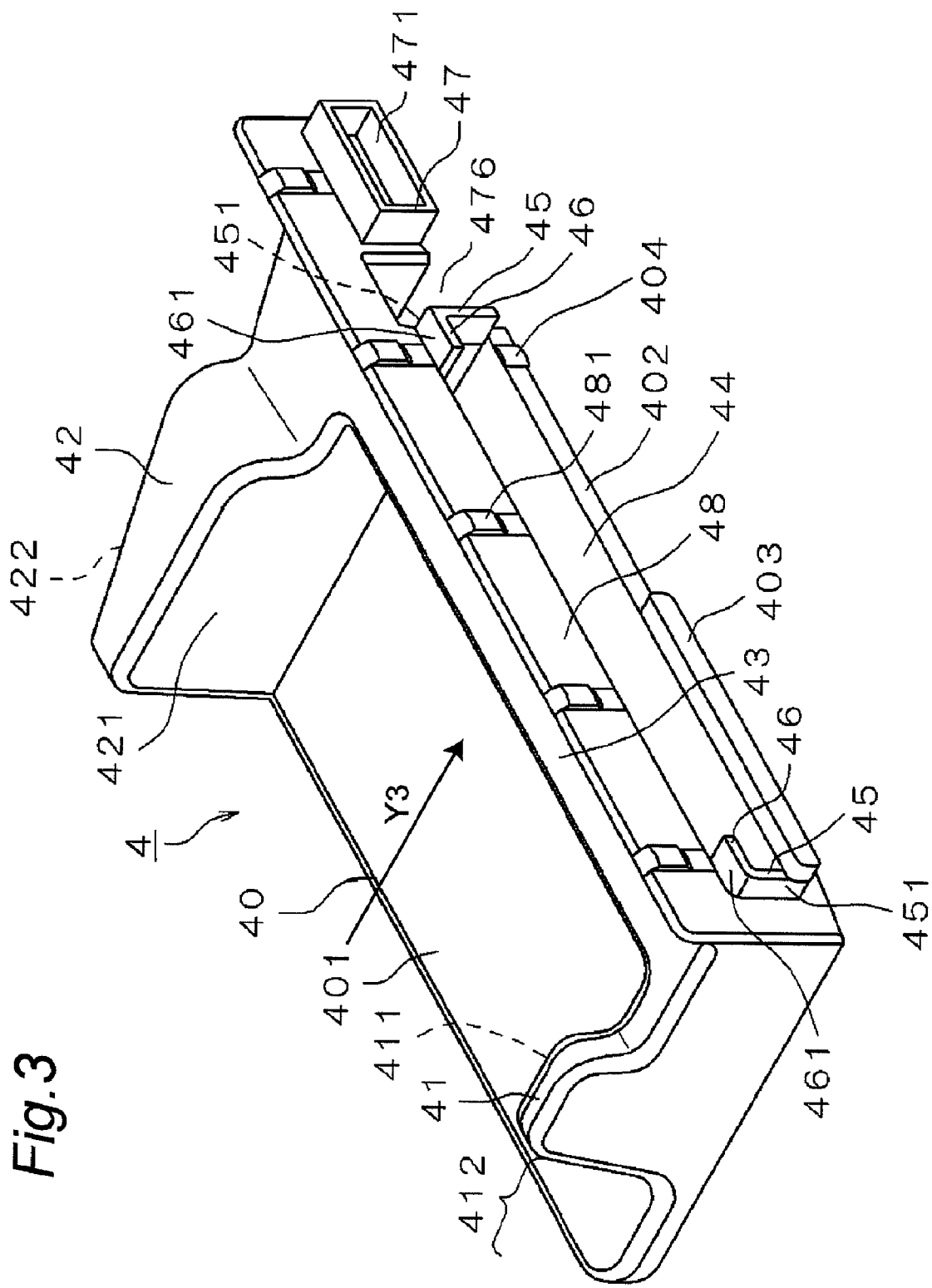
FIG. 3 is an overall perspective view of a protector according to a second embodiment.
Figure 4:
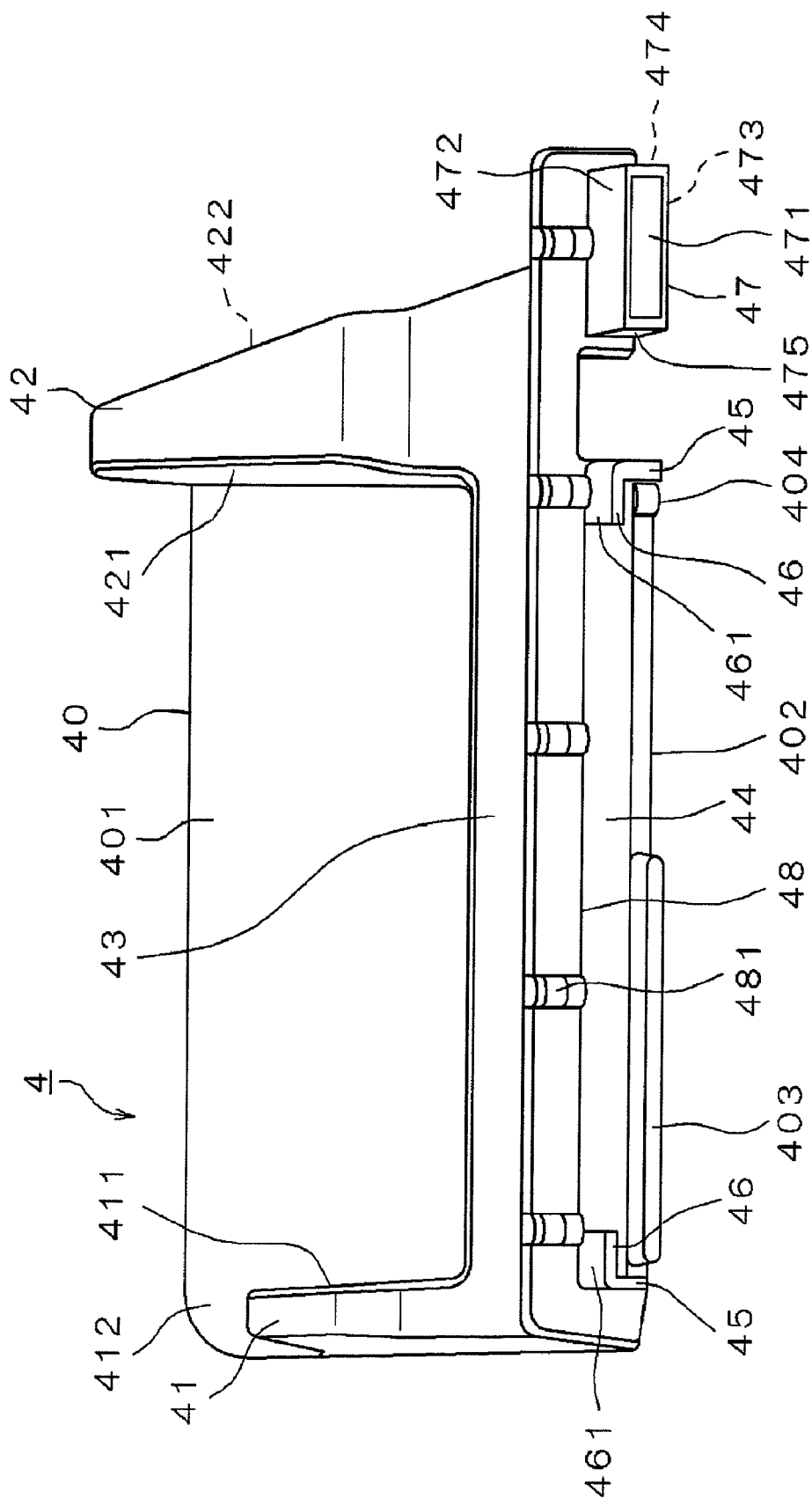
FIG. 4 is a perspective view of the protector according to the second embodiment showing from a forefront side in an insertion direction of a card.
Figure 5:
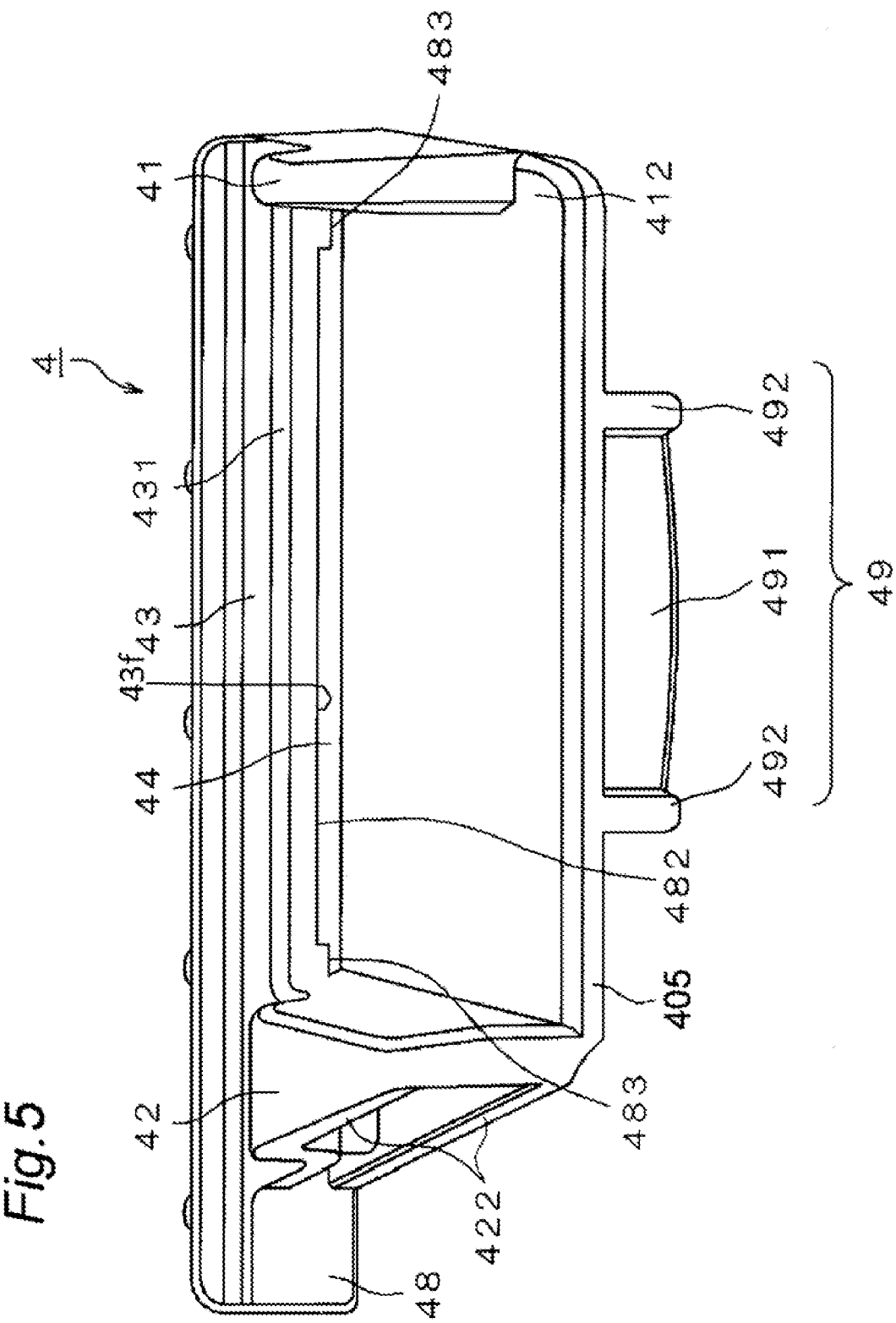
FIG. 5 is a perspective view of the protector according to the second embodiment shown from a base end side in an insertion direction of a card.
Figure 6:
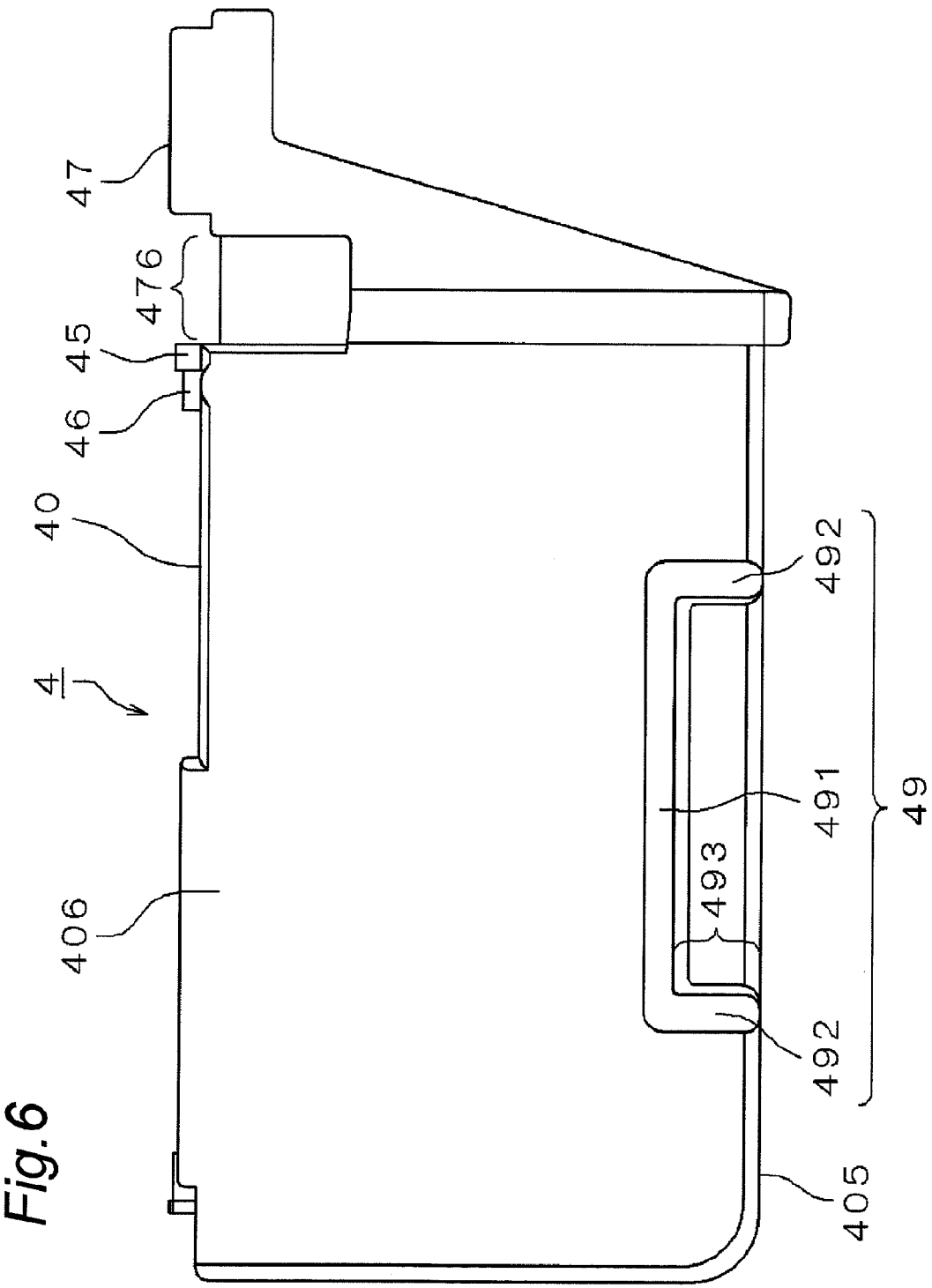
FIG. 6 is a bottom view of the protector according to the second embodiment for explaining a back surface thereof.
Figure 7:
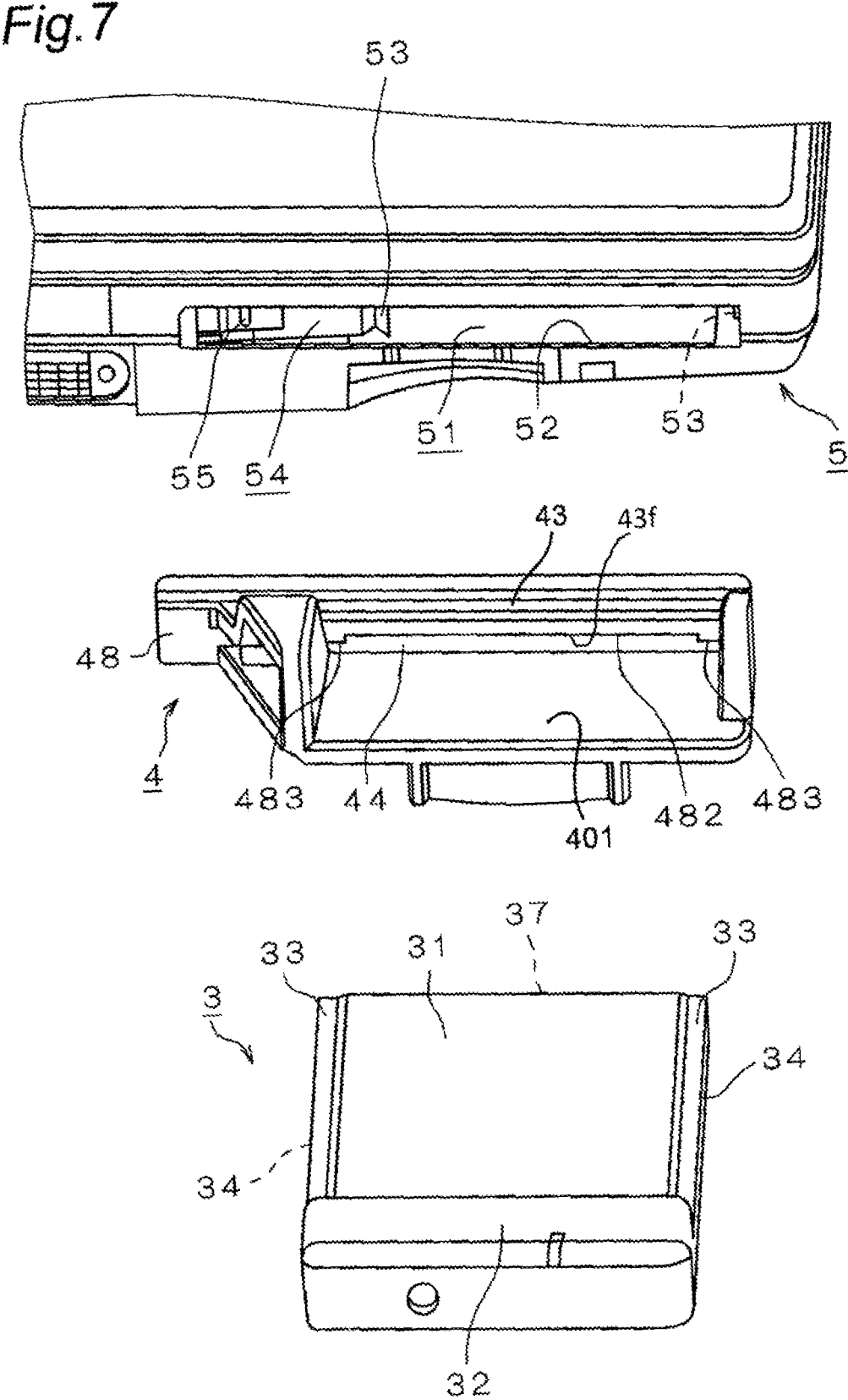
FIG. 7 is a perspective view showing the main part of the protector in a state in which the protector according to the second embodiment is used for a note type PC.

FIG. 3 is an overall perspective view of a protector 4 according to the second embodiment; FIG. 4 is a perspective view of the protector 4 shown from a forefront side in an insertion direction of a card; FIG. 5 is a perspective view of the protector 4 shown from a base end side in the insertion direction of the card; FIG. 6 is a bottom view of the protector 4 for explaining a back surface thereof and FIG. 7 is a perspective view with main parts enlarged while a PC 5 provided with a slot 51, a LAN card 3, and the protector 4 interposed therebetween have not been disposed yet.

As shown in FIGS. 3 to 7, the protector 4 in the present embodiment is to be inserted into the slot 51 (see FIG. 7) formed in a chassis of the note type PC 5. The protector 4 includes a first wall 40 having a guide surface (i.e., a first guide surface) 401 for guiding an insertion movement of the LAN card 3 into the slot 51, and a second wall 43 arranged in parallel to and opposite to at least a part of the first wall 40 with a given distance therebetween.

In the present embodiment, the second wall 43 extends in a given length at a tip in an insertion direction of the LAN card 3 (i.e., in a direction indicated by an arrow Y3 in FIG. 3). Moreover, the second wall 43 has, at the back surface thereof (i.e., on a side opposite to the first guide surface 401), a second guide surface 43f, not shown in FIGS. 3, 4, and 6 but apparent in FIGS. 5, 7, and 8, for guiding the insertion movement of the LAN card 3 in cooperation with at least a part of the first guide surface 401.

Ends of the first wall 40 and the second wall 43 in a direction perpendicular to the card insertion direction (i.e., a widthwise direction) are joined to each other via a pair of vertical walls (i.e., side walls) 41 and 42. The vertical walls 41 and 42 have, inside thereof, side guide surfaces 411 and 421, respectively, for guiding the insertion movement of the side of the LAN card 3 during the insertion.

In the present embodiment, the length of one side wall 41 in the card insertion direction is shorter, by a cutout 412 amount, than the other side wall 42. The reason why the cutout 412 is formed in the side wall 41 is because an antenna or the like turned on a turn shaft parallel to the card insertion direction may be disposed in a convex portion 32 according to the specifications of the LAN card 3 to be used. As a consequence, the formation of the cutout 412 is not indispensable. Such a cutout may be formed in the side wall 42.

Each of the side walls 41 and 42 has a top. The second wall 43 is positioned at the tips in the card insertion direction with steps from the tops. At an outer side surface of at least one of the pair of side walls 41 and 42 (the side wall 42, for example, in the present embodiment) is formed a tapered surface 422 sloping outward along the card insertion direction.

Such a tapered surface 422 is formed at the outer surface of the side wall 42, and therefore, even if an external force is applied from the outside of the side wall 422 (i.e., in a transverse direction) when the LAN card 3 is inserted, the external force can be relieved outward obliquely along the tapered surface 422, thereby enhancing protection performance of the LAN card 3. Incidentally, the tapered surfaces may be formed on both of the side walls 41 and 42.

At the end of the second wall 43 in the card insertion direction is disposed a plate-like portion 48 perpendicular to the card insertion direction. In contrast, at the end of the first wall 40 in the card insertion direction is formed an end (i.e., a first end) 402 perpendicular to the card insertion direction. The ends of the first end 402 and the plate-like portion 48 are located within the same plane. The plate-like portion 48 extends in the thickness direction of the second wall 43, and is disposed in at least one of the first guide surface 401 and the second wall 43 (only on the second wall 43 in the present embodiment). In this case, a surface of the plate-like portion 48 exposed in the card insertion direction is an end (i.e., a second end, not shown) of the second wall 43.

Moreover, the plate-like portion 48 includes a plurality (five, for example, in the present embodiment) of abutments 481 which abut against the chassis surface of the PC 5 with the protector 4 being fitted into the slot 51 in the PC 5. Each of the abutments 481 is formed in such manner as to protrude from the surface of the plate-like portion 48 by a given amount, and further, is formed into a curved surface in such a manner as to be brought into line- or point-contact with the chassis surface.

As described above, the plate-like portion 48 extending in the thickness direction of the second wall 43 is provided, so that the protector 4 can be stably installed at the chassis surface around the slot 51 in the PC 5.

The first end 402 of the first wall 40 also includes abutments 403 and 404 protruding in the same quantity as that of the abutment 481 of the plate-like portion 48. Out of the abutments 403 and 404, the abutment 404 is formed into a curved surface in the same manner as the abutment 481 of the plate-like portion 48.

In this manner, the numerous abutments 481 and 404 excluding the abutment 403 are formed into the curved surfaces and are brought into line- or point-contact with the chassis surface, so that a heavy demand for the shape and dimensional accuracies of the abutment can be alleviated in the case of the abutment at numerous points in comparison with abutment in surface-contact.

Furthermore, the numerous abutments 481 and 404 are brought into line- or point-contact with the chassis surface, so that when an impact load is exerted on the LAN card 3 or the protector 4, the abutments 481 and 404 can cooperatively alleviate the impact exerted in a load exertion direction, thereby suppressing any deformation or breakage, as described later.

It is preferable that all of the constituent elements of the protector 4 including the first wall 40, the second wall 43, and the vertical walls 41 and 42 should be integrally molded with a synthetic resin material.

An opening 44 is defined at the tip in the card insertion direction by the first wall 40, the second wall 43, and the vertical walls 41 and 42. The LAN card 3 is inserted into the slot 51 in the PC 5 through the opening 44.

A side wall protrusion 45 protruding by a given amount from the first end 402 and the plate-like portion 48 in the card insertion direction is formed at a distal end of each of the side walls 41 and 42 in the card insertion direction. Each of the protrusions 45 extends in a vertical direction, with its outer surface defining a fitting surface 451 which is fitted to an inner side surface 53 of an insertion port 52 at the slot 51 in the PC 5.

At least one of the first end 402 and the plate-like portion 48 (only the plate-like portion 48 in the present embodiment) includes a projection piece 46 projecting from the end by a given amount in the card insertion direction. The lateral projection piece 46 is formed integrally with the side wall protrusion 45. The upper surface of each of the projection pieces 46 forms a fitting surface 461 to be fitted to the upper surface of the insertion port 52 formed at the slot 51 in the PC 5.

The lateral projection piece 46 is formed integrally with the side wall protrusion 45, thereby enhancing transverse and vertical restraint performance of the protector 4 with respect to the slot 51 into which the LAN card 3 is inserted, so as to enhance protection performance of the LAN card 3. Here, the lateral projection piece may be formed only on the side of the first end 402, or may be formed at both of the first end 402 and the plate-like portion 48.

At one of the pair of side walls 41 and 42 (the side wall 42 in the present embodiment), a second protrusion 47 is formed in such a manner as to be arranged in the vicinity of the side wall protrusion 45 of the side wall 42 with a gap 476 therebetween and to protrude in the same direction as the side wall protrusion 45 (i.e., in the card insertion direction). The second protrusion 47 is formed in such a manner as to have a rectangular frame, as viewed from the front, and has a cavity 471 inside of the rectangular frame.

The above-described second protrusion 47 can enhance the insertion stability of the protector 4 with respect to the slot 51.

On a back side 406 opposite to the first guide surface 401 of the first wall 40, there is provided a leg portion 49 in a given height (see FIGS. 5 and 6). The leg portion 49 includes a lateral rib 491 separated by a predetermined distance from an end 405 opposite to the insertion side of the first wall 40 with a space 493 therebetween and a pair of right and left vertical ribs 492 extending from both ends of the lateral rib 491 to the end 405 opposite to the insertion side.

It is preferable that the height of the leg portion 49 should be set in such a manner that the tip of the leg portion 49 should be substantially flush with the bottom surface of the PC 5. A user can use the lateral rib 491 as a grip when, for example, the protector 4 is detached from the slot 51 in the PC 5. Therefore, the lateral rib 491 should preferably be disposed in the vicinity to the end 405 opposite to the insertion side, as much as possible. At this time, the space 493 may not always be needed.

As described above, the leg portion 49 having the given height is disposed at the back surface 406 opposite to the first guide surface 401 of the first wall 40, the height of the leg portion 49 being set in such a manner that the tip of the leg portion 49 is substantially flush with the bottom surface of the PC 5, so that the impact load from above the LAN card 3 can be securely received at the installation surface when the PC 5 is disposed on the installation surface during use, thus remarkably enhancing the protection performance of the LAN card 3 in such a case.

Next, a description will be given of a method for inserting and disposing the LAN card 3 into and in the slot 51 in the PC 5 by the use of the protection 4 configured as described above.

Figure 8:
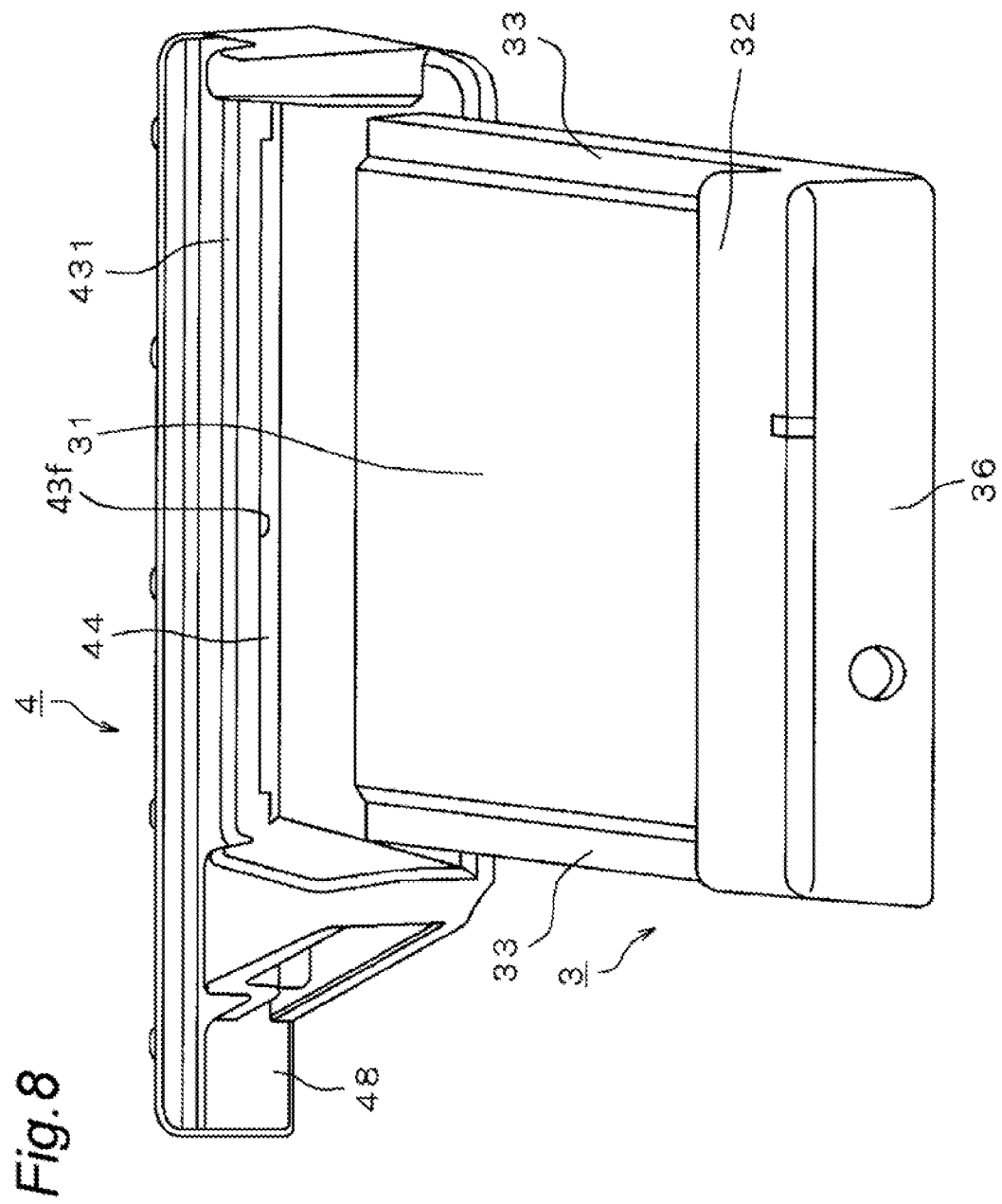
FIG. 8 is a perspective view of a LAN card and the protector according to the second embodiment showing an initial stage of inserting the card along a first guide surface of the protector from a counter-card inserting direction.
Figure 9:
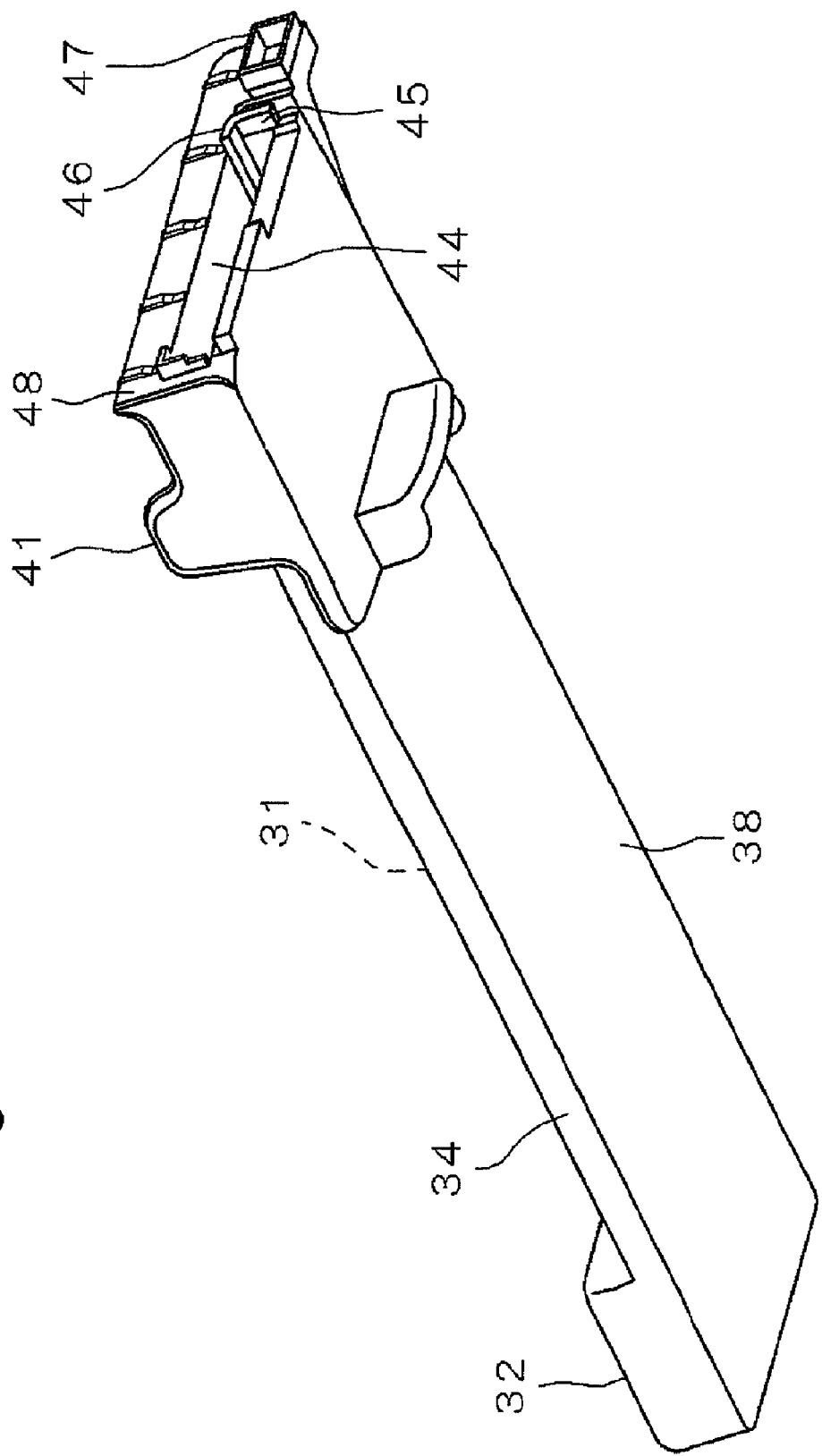
FIG. 9 is a perspective view of the LAN card and the protector in the state of FIG. 8 shown from an obliquely lower side.
Figure 10:
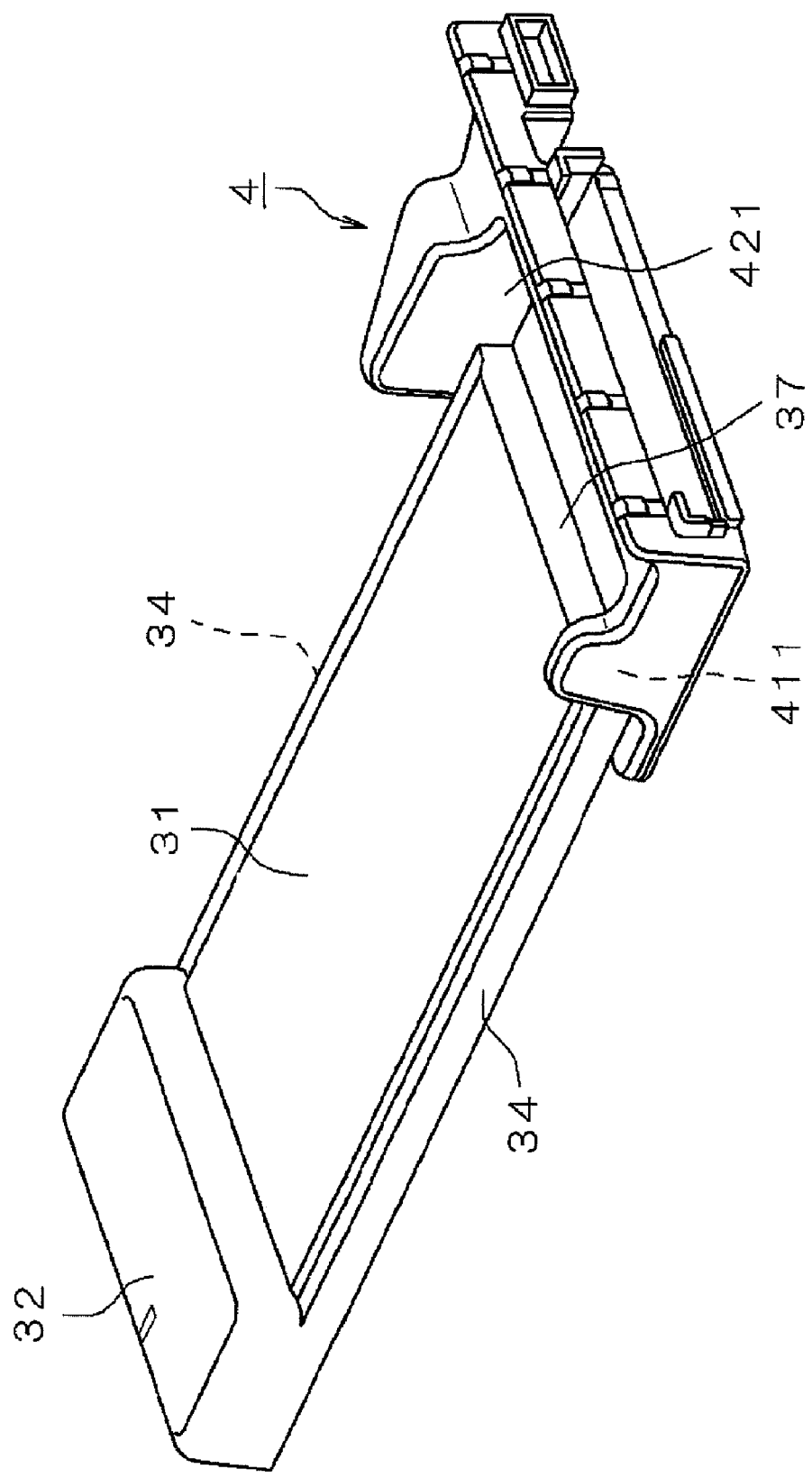
FIG. 10 is a perspective view of the LAN card and the protector in the state of FIG. 8 shown from an obliquely upper side.
Figure 11:
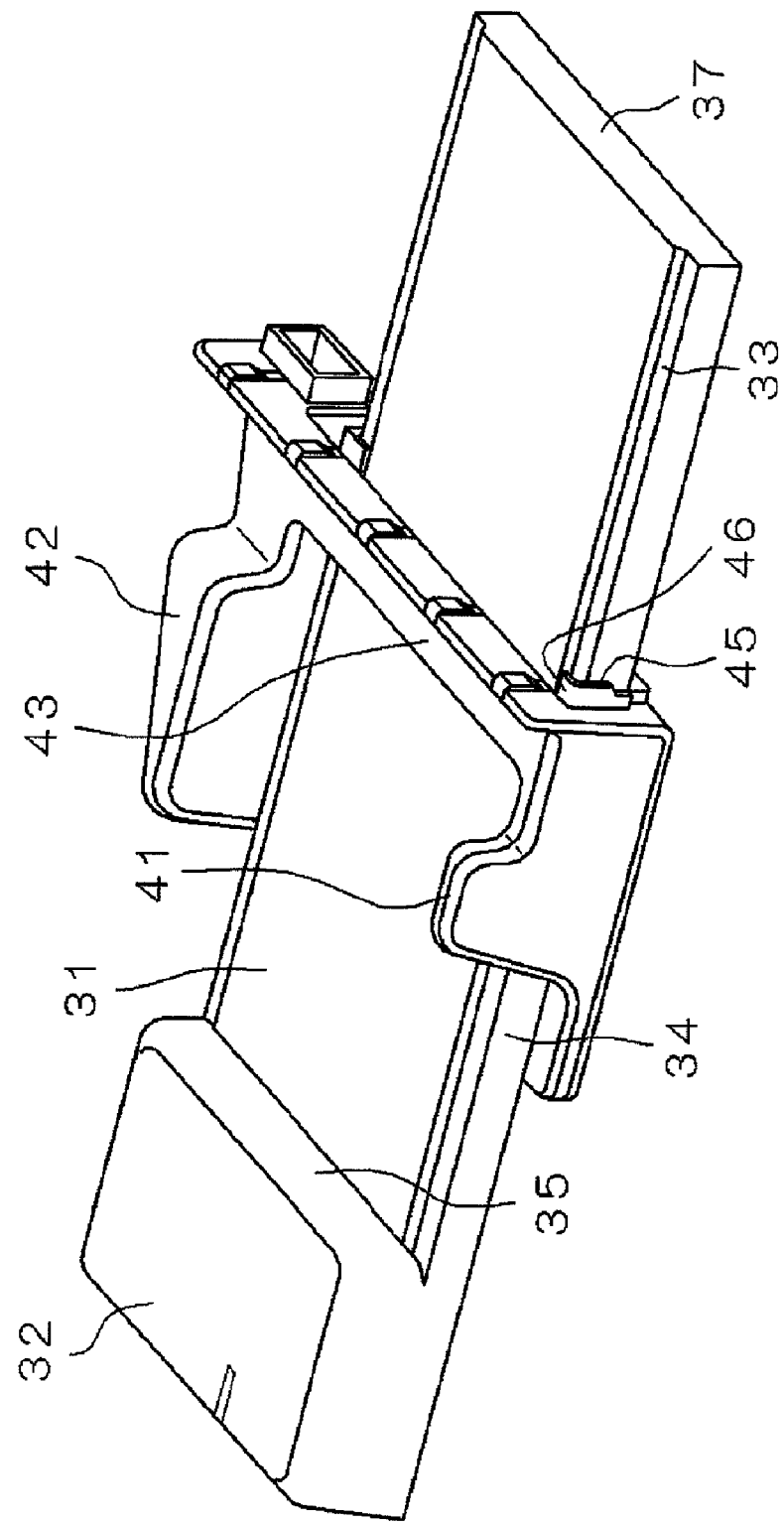
FIG. 11 is a perspective view of the LAN card and the protector showing a middle stage of inserting the card from an obliquely upper side.
Figure 12:
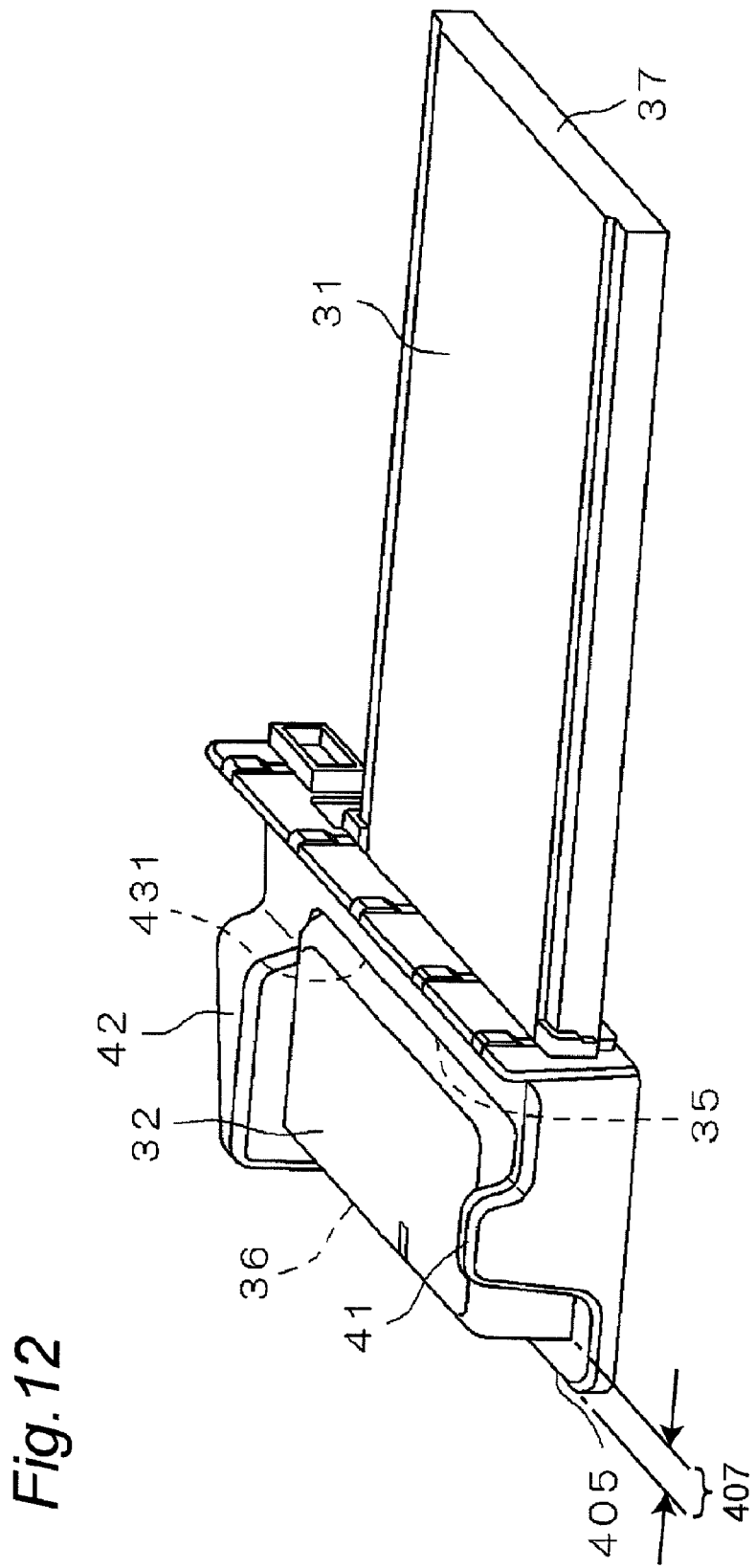
FIG. 12 is a perspective view of the LAN card and the protector showing a finished stage of inserting the card from the obliquely upper side.

FIG. 8 is a perspective view of the LAN card 3 and the protector 4 showing an initial stage of inserting the LAN card 3 along the first guide surface 401 of the protector 4 from a counter-card inserting direction; FIG. 9 is a perspective view of the LAN card 3 and the protector 4 in the state of FIG. 8 shown from the obliquely lower side; FIG. 10 is a perspective view of the LAN card 3 and the protector 4 in the state of FIG. 8 shown from the obliquely upper side; FIG. 11 is a perspective view of the LAN card 3 and the protector 4 showing a middle stage of inserting the card 3 from the obliquely upper side; and FIG. 12 is a perspective view of the LAN card 3 and the protector 4 showing a finished stage of inserting the card from the obliquely upper side.

The LAN card 3 is inserted into the insertion port 51 formed at the slot 52 in the PC 5 in the second embodiment, to be thus disposed in the inside connector, not shown, and then, there is provided an eject button 55 for ejecting the LAN card 3 from the inside connector. The difference between the PC 5 in the second embodiment and the PC 2 in the first embodiment is only that there is provided an eject button container 54 containing the eject button 55 therein. The basic configuration of the PC 5 in the second embodiment is the same as that of the PC 2 in the first embodiment, in which the slot 51 includes the insertion port 52 and the inner side surface 53.

Here, the LAN card 3 to be inserted into the slot 51 is the same as that used in the first embodiment.

When the protector 4 is fitted to the slot 51, the eject button 55 is inserted into the cavity 471 formed at the second protrusion 47 in the protector 4, to be contained inside of the cavity 471. Here, a rib forming a boundary between the eject button container 54 and the slot 51 is designed to be inserted at the gap 476 defined between the side wall protrusion 45 and the second protrusion 47.

When the protector 4 is fitted to the slot 51 in the PC 5, the outer periphery of the second protrusion 47 of the protector 4 is fitted to the inner circumference of the eject button container 54 in the PC 5 by a predetermined press-fitting force (i.e., a fitting force). That is to say, the upper surface 472, bottom surface 473, and right and left side surfaces 474 and 475 (see FIG. 4) of the second protrusion 47 of the protector 4 are fitted with respect to the upper wall, bottom wall, and right and left side walls of the eject button container 54 in the PC 5 by a predetermined fitting force.

With the above-described configuration, the protector 4 can be stably fixed to the slot 51 in the PC 5, and further, the arrangement of the eject button 55 and the peripheral structure of the eject button container 54 can be simplified.

An opening is formed at the tapered surface 422 formed at the outer side surface of the side wall 42. The opening is such constituted as to be opened toward the cavity 471 of the second protrusion 47, and thus, the eject button 55 can be depressed by inserting a finger or a tool from the outside of the tapered surface 422, so that the LAN card 3 can be ejected from the PC 5. In other words, the connection between the connection terminal of the electrode surface 37 at the tip of the card portion 31 and the inside connector (not shown) disposed at the back of the slot 51 is released.

The operability of insertion of a finger or a tool in depressing the eject button 55 can be adjusted by adjusting the taper angle of the tapered surface 422. However, in a case where foreign matter, for example, collide sideways during or during the installation of the LAN card 3 in the PC 5, the tapered surface 422 should preferably have an angle of about 30° in order to alleviate the impact load caused by the foreign matters, like in the present embodiment. In this manner, the taper angle of the tapered surface 422 should be desirably set in consideration of the operability of the eject button 55 and load dispersibility with respect to the impact load from the side.

When the LAN card 3 is inserted into and disposed in the slot 51 in the PC 5 by using the protector 4 configured as described above, the fitting surfaces 451 of the right and left side wall protrusions 45 of the protector 4 are fitted to the inner side surfaces 53 of the insertion port 52 of the slot 51 from the state shown in FIG. 7, and further, the fitting surfaces 461 of the lateral projection pieces 46 are fitted to the upper surface of the insertion port 52. At this time, the fitting surfaces 451 of the right and left side wall protrusions 45 and the fitting surfaces 461 of the lateral projection pieces 46 are fitted to the inner side surfaces 53 and upper surface of the insertion port 52 of the slot 51 by the predetermined fitting forces.

At the same time, the outer periphery of the second protrusion 47 of the protector 4 is fitted to the inner circumference of the eject button container 54 in the PC 5 by the predetermined fitting force. In other words, the upper surface 472, bottom surface 473, and right and left side surfaces 474 and 475 of the second protrusion 47 of the protector 4 are fitted to the upper wall, bottom wall, and right and left side walls of the eject button 54 in the PC 5 by the predetermined fitting force. In this manner, the protector 4 is fixed to the chassis of the PC 5.

With the protector 4 being fixed to the chassis of the PC 5 in the above-described manner, the back surface of the LAN card 3 is placed on the first guide surface 401 of the first wall 40, and then, it is allowed to slide in the insertion direction, like in the first embodiment (see, FIGS. 8 to 10). The tip of the card portion 31 of the LAN card 3 sliding on the first guide surface 401 protrudes toward the insertion port 52 of the slot 51 beyond the plate-like portion 48 formed integrally with the first end 402 of the first wall 40 and the second wall 43 through the opening 44.

Thereafter, the insertion proceeds (see FIG. 11), and then, an abutment surface 35 formed at the convex portion 32 of the LAN card 3 abuts against a position restricting surface 431 formed at the second wall 43, as shown in FIG. 12, and further, the connection terminal of the electrode surface 37 at the tip of the card portion 31 is connected to the inside connector disposed at the back of the slot 51, thus completing the insertion and installation of the LAN card 3 into the slot 51 (see FIG. 12).

In this manner, the side wall protrusions 45 and the lateral projection pieces 46 are fitted to the inner side surfaces 53 of the slot 51 by the predetermined fitting force. Moreover, the second protrusion 47 is fitted to the inner circumference of the eject button container 54 by the predetermined fitting force. As a consequence, the side wall protrusion 45, lateral projection piece 46, and second protrusion 47 should preferably be made of a flexible material. In the present embodiment, the protector 4 as a whole is integrally molded with a synthetic resin material.

Additionally, guide protrusions 483 are formed at right and left ends at the back surface of the second wall 43 of the protector 4 (i.e., on the side of the opening 44), specifically, the lower portion of the plate-like portion 48, like in the first embodiment. A guide recess 482 is formed between the guide protrusions 483. When the card portion 31 is inserted into the slot 51 in the PC 5, the guide groove 33 formed at the card portion 31 is guided in engagement with the guide protrusion 483 of the protector 4, so that the card portion 31 can be smoothly inserted with stability.

Here, the length of an interval defined between the right and left guide protrusions 483 (i.e., the length of the guide recess 482 in the card width direction) is set to be smaller than that of an interval defined between the right and left side wall protrusions 45 (i.e., the length of the opening 44 in the card width direction). As a consequence, it is possible not only to readily insert the LAN card 3 between the side wall protrusions 45 but also to readily absorb the impact load by the protector 4 when the impact load is exerted on the LAN card 3 from either one of the side walls 34 (i.e., in the transverse direction) during the insertion of the LAN card 3. Thus, it is possible to effectively suppress the generation of damage on, for example, the slot 51 in the PC 5 or the inside connector, not shown, at the back. Similarly, the height of each of the right and left guide protrusions 483 from the first guide surface 401 is set to be smaller than that of the back surface of the second wall 43 from the first guide surface 401. As a consequence, it is possible to readily absorb the impact load by the protector 4 when the impact load is exerted on the LAN card 3 in the direction perpendicular to the card portion 31 (i.e., in the vertical direction) during the insertion of the LAN card 3. Thus, it is possible to effectively suppress the generation of damage on, for example, the slot 51 in the PC 5 or the inside connector; not shown, at the back.

If an impact force is exerted on the LAN card 3 in the transverse direction (i.e., in a direction substantially perpendicular to the card side surface 34) with the LAN card 3 being inserted into and disposed in the slot 51, the impact force and a moment load associated therewith can be actually received at the fitting portion between the fitting surface 451 of the side wall protrusion 45 of the protector 4 and the inner side surface 53 of the slot 51, and additionally, at the fitting portion between the outer periphery of the second protrusion 47 and the inner circumference of the eject button container 54, thus effectively alleviating damage on the LAN card 3 and the slot 51, and further, the electrode surface 37 provided in the LAN card 3 and the inside connector at the back of the slot 51.

If the impact force is exerted on the LAN card 3 in the transverse direction (i.e., in the direction substantially perpendicular to the card side surface 34) during an initial process in which the LAN card 3 is inserted into the slot 51, the impact force and the moment load associated therewith are applied to the fitting portion between the fitting surface 451 of the side wall protrusion 45 of the protector 4 and the inner side surface 53 of the slot 51, and additionally, to the fitting portion between the outer periphery of the second protrusion 47 and the inner circumference of the eject button container 54. In a case where the impact force is a predetermined value or less, the impact force and the moment load associated therewith are received at the fitting portions. In contrast, if the impact force is greater than the predetermined value, the impact force and the moment load associated therewith cannot be received at the fitting portion, and therefore, the engagement is released. As a consequence, it is possible to avoid any large damage on the LAN card 3 and the slot 51.

Moreover, if the impact force is exerted on the card portion 31 of the LAN card 3 in the direction perpendicular to the card portion 31 (i.e., in the direction perpendicular to the card surface) with the LAN card 3 being inserted into and disposed in the slot 51, the impact force and the moment load associated therewith can be actually received at the fitting portions between the fitting surface 461 of the lateral projection piece 46 of the protector 4 and the lower surface of the side wall protrusion 45, and the upper and lower inner surfaces of the slot 51, and additionally, the fitting portion between the outer periphery of the second protrusion 47 and the inner circumference of the eject button container 54, thus effectively alleviating the damage on the LAN card 3 and the slot 51, and further, the electrode surface 37 provided in the LAN card 3 and the inside connector at the back of the slot 51.

If the impact force is exerted on the card portion 31 of the LAN card 3 in the direction perpendicular to the card portion 31 (i.e., in the direction perpendicular to the card surface) during an initial process in which the LAN card 3 is inserted into the slot 51, the impact force and the moment load associated therewith are exerted on the fitting portions between the fitting surface 461 of the lateral projection piece 46 and the lower surface of the side wall protrusion 45 in the protector 4 and the upper and lower inner surfaces of the slot 51, and additionally, the fitting portion between the outer periphery of the second protrusion 47 and the inner circumference of the eject button container 54. In a case where the impact force is a predetermined value or less, the impact force and the moment load associated therewith are received at the fitting portion. In contrast, if the impact force is greater than the predetermined value, the impact force and the moment load associated therewith cannot be received at the fitting portion, and therefore, the engagement is released. As a consequence, it is possible to avoid the LAN card 3 and the slot 51 being largely damaged.

The guide recess 482 for guiding the card portion 31 of the LAN card 3 and the guide protrusion 483 to be fitted to the guide groove 33 of the LAN card 3 are provided at the back surface (the side of the opening 44) of the second wall 43 of the protector 4, as described above, thus not only facilitating the insertion of the LAN card 3 into the protector 4 but also enhancing load capacity against the moment load associated with the impact force by the length of the second wall 43 in the card insertion direction as for the impact force in any of the above-described directions.

As described above, the protrusions 45 and 46 provided in the protector 4 are fitted to the insertion port 52 of the slot 51, through which the LAN card 3 is inserted, in the present embodiment, so that the LAN card 3 can be protected from the external force in not only upward and downward directions of the LAN card 3 but also the transverse direction. In addition, it is possible to effectively suppress not only the damage of the LAN card 3 per se but also the damage on the inside connector in the PC 5 to be connected to the LAN card 3.

Incidentally, the impact force exerted on the LAN card 3 is transmitted to the slot 51 in the PC 5 through the side wall protrusion 45, lateral projection piece 46, and second protrusion 47 of the protector 4, and further, is transmitted to the chassis surface around the slot 51 in the PC 5 through the curved abutments 404 and 481 and the flat abutment 403 formed at the tip of the protector 4 in the card insertion direction, thus absorbing the impact force at the chassis surface.

In this manner, it is possible to effectively suppress the generation of damage on the LAN card 3 or the slot 51 by absorbing the impact force by both of the inside of the protector 4 and the chassis of the PC 5.

As described above, although the abutments 403, 404, and 481 are formed at the tip of the protector 4 in the card insertion direction in the present embodiment, these abutments 403, 404, and 481 are not indispensable. The first end 402 of the first wall 40 and the plate-like portion 48 of the second wall 43 may be brought into surface-contact with the chassis surface. However, the impact force is rarely exerted on the chassis surface in the vertical direction, and therefore, the abutments 403, 404, and 481 are formed, and further, at least some of them (i.e., the abutments 404 and 481) are brought into point- or line-contact with the chassis surface, thereby dispersing the impact force.

Upon completion of the insertion of the LAN card 3 into the slot 51, the protector 4 is brought into contact with the chassis surface actually at the curved abutments 481 (five in the drawings), the flat abutment 403, and the curved abutment 404.

Either during or after the insertion of the LAN card 3 into the slot 51, the impact force is very rarely exerted in the direction perpendicular to the chassis surface having the slot 51 with the exertion of the impact force caused by collision of the LAN card 3 against foreign matters or falling of the foreign matters. Normally, the impact force is exerted obliquely or substantially in parallel to the chassis surface.

Consequently, when the protector 4 is brought into surface-contact with the chassis surface, a deviation force occurs at the contact surface caused by the exerted impact force, and then, a strain is applied to the insertion port 52 of the slot 51 or the connector, thereby causing damage on not only the LAN card 3 but also the insertion port 52 of the slot 51 and/or the inside connector.

However, the abutments 403, 404, and 481 are formed at the protector 4, and further, most of them (i.e., the abutments 404 and 481) are formed into the curved shape and are brought into point- or line-contact with the chassis surface in the present embodiment, and therefore, the exerted impact force is alleviated according to the exertion direction of the impact force, thus suppressing the generation of deformation or breakage on the LAN card 3, the insertion port 52 of the slot 51, and/or the inside connector.

Incidentally, the flat abutment 403 has the flat surface. The chassis surface of the PC 5, against which the abutment 403 abuts, generally has a slight slope caused by a draft at the time of chassis molding or has slight unevenness at the chassis surface, as shown in FIG. 7. Therefore, the abutment 403 is never brought into complete surface-contact with the chassis surface, but actually, it is brought into substantial line-contact with the chassis surface. In view of this, the flat abutment 403 also actually can produce the same alleviation effect as that in the curved abutments 404 and 481.

Moreover, as shown in FIG. 12, when the card portion 31 of the LAN card 3 is inserted into the slot 51 in the PC 5, the convex portion 32 protrudes outward from the chassis surface of the PC 5 whereas the lower surface is supported at the first guide surface 401 of the first wall 40. As a consequence, it is possible to enhance the protection performance of the LAN card 3 provided with the convex portion 32 protruding outward from the chassis surface of the PC 5 in the insertion state.

At this time, as shown in FIG. 12, the end surface (i.e., the back surface) 36 of the convex portion 32 in the counter-card insertion direction is shifted by the distance of a cavity 407 from the edge of the first guide surface 401 in the card insertion direction. That is to say, the convex portion 32 of the LAN card 3 after the insertion is fully contained inside of the protector 4. With this configuration, even if the impact force is exerted in the direction of the back surface 36 of the inserted LAN card 3, the impact force can be scarcely exerted directly on the LAN card 3, but in most cases, the protector 4 directly receives the impact force so as to transmit the received impact force to the chassis. Thus, it is possible to suppress damage to the LAN card 3 per se or the inside connector of the PC 5 via the LAN card 3. Here, as the cavity 407 is longer, the impact function is safer. However, when the cavity 407 is too long, it is liable to collide with foreign matter. Therefore, the cavity 407 should preferably be about 5 mm or less.

Although the LAN card exemplifies the plate-like peripheral device in either of the above-described embodiments, the protector according to the present invention is not restricted to protecting only the LAN card, but can be effectively applied to other kinds of plate-like peripheral devices of so-called PC cards such as a so-called smart card having a semiconductor device embedded therein, which is used in personally authenticating mobile electronic equipment, or a universal serial bus card.

In addition, although the personal computer exemplifies the predetermined objective equipment into which the plate-like peripheral device is to be inserted, in either of the above-described embodiments, the present invention is not limited to this. The protector for protecting the plate-like peripheral device can be effectively applied to other kinds of electronic equipment or general equipment into which the plate-like peripheral device is to be inserted.

In this manner, the present invention is not limited to the above-described embodiments, and therefore, it is understood that modifications and improvements should be made within the scope without departing from the subject matters.

The present invention relates to the protector for the plate-like peripheral device which is to be inserted into the insertion site of the predetermined objective equipment. The protector according to the present invention can be effectively utilized as the protector for protecting, from the mechanical impact, the plate-like peripheral device such as the LAN card to be inserted into the slot of the electronic equipment body such as the personal computer.

The invention claimed is:

1. A protector for a plate-like peripheral device to be used by inserting into an insertion site of a predetermined objective equipment, comprising:
    a first wall including a first guide surface for guiding insertion movement of the plate-like peripheral device in an insertion direction, said first wall having first and second end portions;
    a second wall arranged in parallel with and opposite to at least a part of the first wall with a given distance therebetween, said second wall including a second guide surface for guiding insertion movement of the plate-like peripheral device in cooperation with at least a part of the first guide surface, and said second wall having first and second end portions;
    a pair of side walls formed in parallel with the insertion direction of the plate-like peripheral device, said pair of side walls including a first side wall and a second side wall, said first side wall connecting together the first end portion of the first wall and the first end portion of the second wall in a width-wise direction thereof which is perpendicular to said insertion direction, and a second side wall connecting together the second end portion of the first wall and the second end portion of the second wall in said width-wise direction;
    wherein a first end surface and a second end surface, that are perpendicular to said insertion direction, are formed respectively at end portions in said insertion direction of the first wall and the second wall; and
    wherein said first and second side walls provided with first and second protrusions which protrude by a given amount in said insertion direction beyond the first end surface and the second end surface;
    wherein an opening is defined by said first wall, said second wall, said first side wall, and said second side wall, said opening being configured to allow the plate-like peripheral device to be inserted therethrough in said insertion direction; and
    wherein said opening and said first and second protrusions are arranged to allow the plate-like peripheral device to be inserted, in said insertion direction, between and through the first and second protrusions when inserted through said opening.

2. The protector according to claim 1, wherein at least one of the first end surface and the second end surface is provided with a projection piece which projects by a given amount in said insertion direction from said at least one of the first end surface and the second end surface, and the projection piece is formed integrally with the protrusion.

3. The protector according to claim 1, wherein at least one of the first end surface and the second end surface is provided with a plate-like portion extending in a direction of a thickness of the first wall or the second wall.

4. The protector according to claim 1, wherein at least one of the first and second side walls is provided with a second protrusion that is arranged in a vicinity of said protrusion of said at least one of the first and second side walls and that protrudes in a same direction as said at least one of the first and second side walls.

5. The protector according to claim 1, wherein a tapered surface sloping outward along the insertion direction of the plate-like peripheral device is formed on an outer side surface of at least one of the first and second side walls.

6. The protector according to claim 1, wherein a leg portion having a given height is provided on a back surface that is opposite to the first guide surface of the first wall.

7. The protector according to claim 1, wherein the protector is configured for use with the plate-like peripheral device provided with a convex portion which is to protrude outward from a chassis of the predetermined objective equipment in a state in which the plate-like peripheral device is inserted into the insertion site of said objective equipment; and wherein the first guide surface of the first wall is arranged to guide the insertion movement of the plate-like peripheral device when the plate-like peripheral device is being inserted into the insertion site of the objective equipment, while said first guide surface supports the convex portion in the state in which the plate-like peripheral device is inserted into the insertion site of the objective equipment.

8. An electronic equipment comprises a chassis being provided with an insertion site into which a plate-like peripheral device is inserted, an inner terminal provided at an inner portion of the insertion site of the chassis in order to receive a connection terminal provided at an end in an insertion direction of the plate-like peripheral device, and being used with said plate-like peripheral device by inserting it into the insertion site through the protector according to claim 4, wherein the electronic equipment is provided with a release element for releasing a connection between said inner terminal and said connection terminal of the plate-like peripheral device, and the release element is located in a space formed in the second protrusion.

9. An electronic equipment comprises a chassis being provided with an insertion site into which a plate-like peripheral device is inserted, an inner terminal provided at an inner portion of the insertion site of the chassis in order to receive a connection terminal provided at an end in an insertion direction of the plate-like peripheral device, and being used with said plate-like peripheral device by inserting it into the insertion site through the protector according to claim 5, wherein the electronic equipment is provided with a release element for releasing a connection between said inner terminal and said connection terminal of the plate-like peripheral device, and the release element is located in a space formed in the second protrusion.

10. An electronic equipment comprises a chassis being provided with an insertion site into which a plate-like peripheral device is inserted, an inner terminal provided at an inner portion of the insertion site of the chassis in order to receive a connection terminal provided at an end in an insertion direction of the plate-like peripheral device, and being used with said plate-like peripheral device by inserting it into the insertion site through the protector according to claim 6, wherein the electronic equipment is provided with a release element for releasing a connection between said inner terminal and said connection terminal of the plate-like peripheral device, and the release element is located in a space formed in the second protrusion.

11. An electronic equipment comprises a chassis being provided with an insertion site into which a plate-like peripheral device is inserted, an inner terminal provided at an inner portion of the insertion site of the chassis in order to receive a connection terminal provided at an end in an insertion direction of the plate-like peripheral device, and being used with said plate-like peripheral device by inserting it into the insertion site through the protector according to claim 7, wherein the electronic equipment is provided with a release element for releasing a connection between said inner terminal and said connection terminal of the plate-like peripheral device, and the release element is located in a space formed in the second protrusion.

* * * * *

UNITED STATES PATENT AND TRADEMARK OFFICE
CERTIFICATE OF CORRECTION

PATENT NO. : 8,164,908 B2
APPLICATION NO. : 12/510583
DATED : April 24, 2012
INVENTOR(S) : Tsuyoshi Tamura Page 1 of 1

It is certified that error appears in the above-identified patent and that said Letters Patent is hereby corrected as shown below:

IN THE CLAIMS
In column 16, line 50, (claim 1, line 29), "side walls provided" should read
--side walls are provided--.

Signed and Sealed this
Eleventh Day of September, 2012

David J. Kappos
*Director of the United States Patent and Trademark Office*